UNITED STATES PATENT OFFICE.

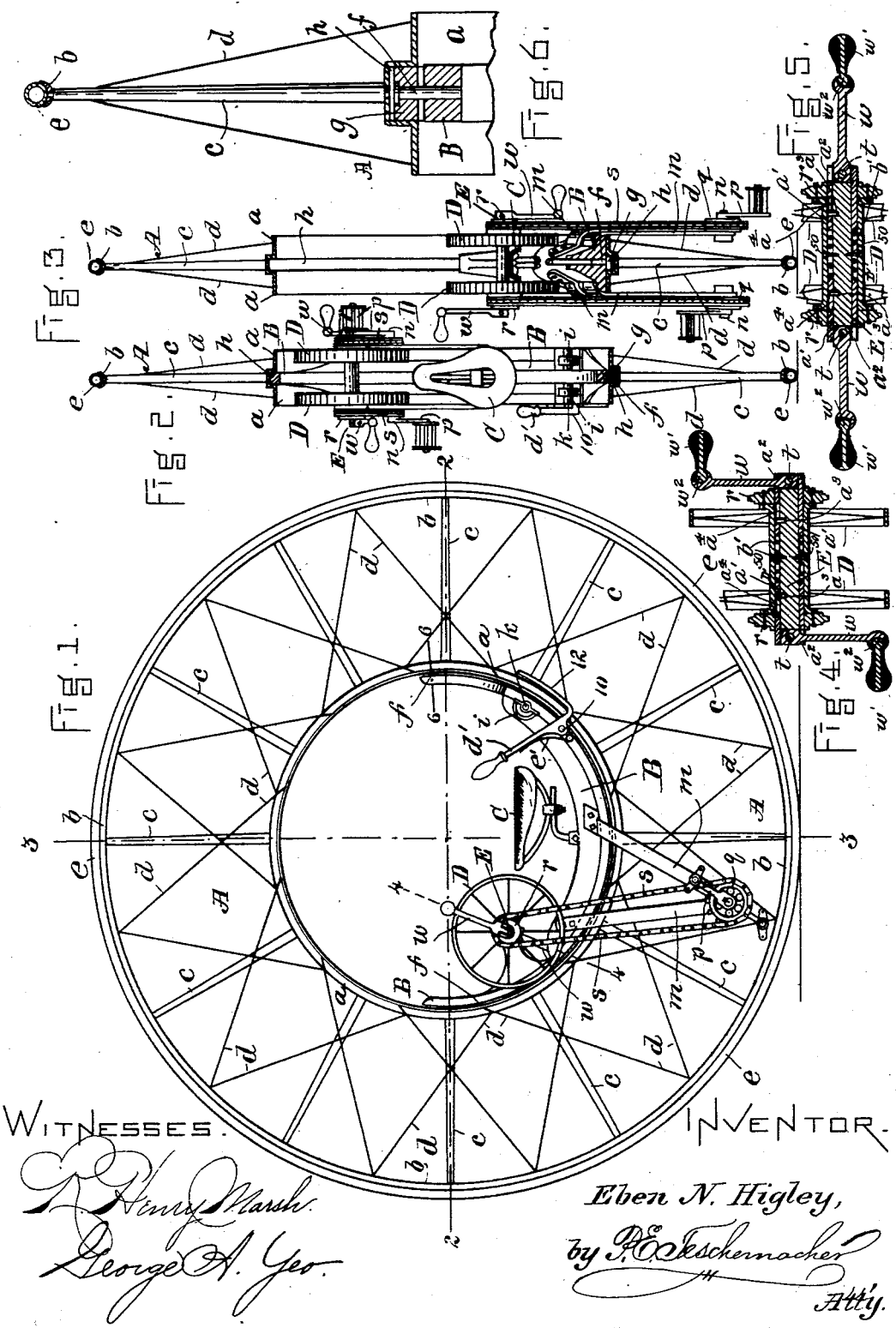

EBEN N. HIGLEY, OF SOMERSWORTH, NEW HAMPSHIRE, ASSIGNOR TO THE UNIVERSAL CYCLE COMPANY, OF SAME PLACE.

UNICYCLE.

SPECIFICATION forming part of Letters Patent No. 541,356, dated June 18, 1895.

Application filed September 7, 1894. Serial No. 522,349. (No model.)

*To all whom it may concern:*

Be it known that I, EBEN N. HIGLEY, a citizen of the United States, residing at Somersworth, in the county of Strafford and State of New Hampshire, have invented certain Improvements in Unicycles, of which the following is a full, clear, and exact description, reference being had to the accompanying drawings, making part of this specification, in which—

Figure 1 is a side elevation of a unicycle constructed in accordance with my invention. Fig. 2 is a horizontal section on the line 2 2 of Fig. 1. Fig. 3 is a vertical section on line 3 3 of Fig. 1. Fig. 4 is an enlarged vertical section on the line 4 4 of Fig. 1. Fig. 5 is a similar section with the handle-bar in a horizontal position. Fig. 6 is an enlarged section on the line 6 6 of Fig. 1.

My invention has for its object to simplify and improve the construction of unicycles, whereby the friction is reduced to a minimum, and the feet of the rider at all times brought within reach of the ground.

To this end my invention consists in certain novel features and combinations of parts, as hereinafter set forth and specifically claimed.

In the said drawings A represents the main-wheel, having inner and outer concentric rims $a, b$, connected by wooden radial spokes $c$, and angular wire spokes $d$, the outer rim $b$ being preferably provided with a pneumatic tire $e$, of any suitable or approved construction.

B is a saddle of semi-circular form, which is supported within the inner rim $a$, and is provided on its under side with studs $f$, Figs. 2 and 6, upon which are mounted anti-friction rolls $g$, fitting loosely within an annular central groove $h$, formed in the inner face of the inner rim $a$, said rolls and groove serving to hold the saddle in its proper central position with relation to the wheel A, which revolves around it.

C is a seat adjustably secured to the saddle B, and behind the seat are arranged a pair of anti-friction wheels $i, i$, mounted upon a short transverse shaft $k$, supported in suitable bearings in the saddle, said wheels $i, i$, running on the inner face of the inner rim $a$, on each side of a vertical plane, passing longitudinally through the center of the saddle.

In front of the seat C, are two driving wheels D, D, mounted on a hub D' which is secured by screws or pins 50 to a driving shaft E, supported in suitable bearings in a lug or support projecting from the upper side of the saddle, said wheels D, D, being in frictional contact with and running upon the inner face of the inner rim $a$, of the wheel A, on either side of the groove $h$, in the same plane, or nearly the same plane as the anti-friction wheels $i, i$, the weight of the saddle and rider upon the seat C, being thus brought upon the wheels $i, i$, and D, D, which rest upon the inner face of the rim $a$, of the wheel A, as the latter is rotated by the frictional contact therewith of the driving wheels D, D.

Secured to the opposite sides of the saddle B, and extending downward therefrom are two brackets $m, m$, carrying at their lower ends short crank-shafts $n, n$, to which are secured pedal-cranks $p, p$, and sprocket wheels $q, q$, over which and sprocket wheels $r, r$, on the ends of hub D', pass chains $s, s$, by which the driving shaft and wheels are rotated as the pedals are actuated by the feet of the rider upon the seat C. By thus arranging the wheels $i, i$, and D, D, in pairs so that the two wheels of a pair will bear upon opposite sides of the groove $h$, in the rim $a$, the power is applied equally upon opposite sides of a vertical plane passing through the center of the machine, whereby the rider is evenly balanced and the machine rendered more steady and prevented from wabbling as it passes over the ground. Furthermore by my construction the seat is placed at such a height that the feet of the rider are always within reach of the ground, thereby enabling him to avoid injury from an accidental fall, and also rendering the machine capable of being easily started from a stationary position when the rider is seated in the saddle with his feet upon the ground.

To each of the opposite ends of the driving shaft E, is pivoted or hinged at $t$, a bar $w$, which when placed in line with the driving shaft as shown in Fig. 5, forms a handle-bar adapted to be grasped by the hand of the rider, said bar being adapted to be locked in this position by a short sleeve $a'$, which slides upon the end of the driving shaft over the joint $t$, as shown in Fig. 5, a spring $b'$, being preferably placed behind the sleeve to keep it in position over the joint as required. By pushing the sleeve $a'$ backward to uncover the joint the bar $w$, may be placed at an angle to the driving shaft as shown in Figs. 1, 2, 3, and 4, thus forming a crank-handle, the rider being thus enabled to use both his feet and hands in propelling the machine. The sleeves $a'$ are prevented from being pressed out too far by means of pins $a^3$ on the drive shaft E which enter slots $a^4$ in the said sleeves.

In order that the outer edges of the sleeves $a$ may not engage the edges of the bars $w$ when they are at right angles to the shaft E as shown in Fig. 4, and thus tend to throw them outwardly, I slot the ends of said sleeves as at $a^2$ and thus the portions of the sleeves directly opposite the said slots $a^2$ will overlap the hinged ends of the bars $w$ and lock them in place.

To the outer ends of the bars $w$ are secured the handles $w'$; the two being connected by a ball and socket joint $w^2$ as clearly shown in Figs. 4 and 5. When the bars $w$ are at right angles to the shaft, then the handles will be swung at right angles to the bars and form crank handles, but when the bars are in alignment with the shaft E, the handles $w'$ will also be swung into alignment therewith.

To the saddle B, behind the seat C, is pivoted at 10, a lever $d'$, carrying at its outer end a flat brake-shoe 12, adapted to be brought into contact with the outer face of the inner rim $a$, to retard and arrest the motion of the machine, the lever $d'$ being provided with a light spring $e'$, which acts to keep the brake-shoe normally out of contact with the rim $a$.

What I claim as my invention, and desire to secure by Letters Patent, is—

1. The combination with the drive wheels having a hub, of the drive shaft secured in and of less diameter than said hub, sleeves sliding between the hub and shaft, and handle bars pivoted to the ends of the said shaft to swing in alignment therewith or at an angle thereto; the said sleeves being slotted at their outer ends and serving to lock the handle bars in either position, substantially as set forth.

2. The combination with the drive wheels having a hub, of the drive shaft secured in and of less diameter than said hub, sleeves sliding between the hub and drive shaft and each having a slot in its outer end handle bars pivoted to the ends of the shaft and adapted to be locked by said sleeves in alignment with the shaft or at right angles thereto, and handles jointed to the outer ends of the handle bars to serve as crank handles, substantially as set forth.

3. The combination with the drive wheels having a hub, a drive shaft of less diameter extending through and secured in said hub, spring pressed sleeves sliding on the shaft within the hub and each having a slot in its outer end; the space between the inner ends of the sleeves serving as a spring chamber, and the handle bars hinged to the ends of the drive shaft and adapted to be locked in alignment therewith or at right angles thereto by said sleeves, substantially as set forth.

4. The combination with the drive wheels and shaft of sliding sleeves on the said shaft and each provided with a slot in its outer end, and the handle bars hinged to the ends of the shaft and adapted to be swung at right angles to the shaft; the sleeves being adapted to be slid outwardly over the joint with the handle bars extending through their slots; said handle bars being also constructed to swing into alignment with the shaft and be locked by said sleeves, substantially as set forth.

Witness my hand this 4th day of September, A. D. 1894.

EBEN N. HIGLEY.

In presence of—
P. E. TESCHEMACHER,
J. S. F. HUDDLESTON.